(12) United States Patent
Gheorghe

(10) Patent No.: US 10,812,323 B2
(45) Date of Patent: Oct. 20, 2020

(54) TECHNIQUES TO PROVIDE RELAY SERVER CONFIGURATION FOR GEOGRAPHICALLY DISPARATE CLIENT DEVICES

(71) Applicant: WhatsApp Inc., Mountain View, CA (US)

(72) Inventor: Claudiu Dan Gheorghe, Mountain View, CA (US)

(73) Assignee: WhatsApp. Inc., Menlo Park, CA (US)

( * ) Notice: Subject to any disclaimer, the term of this patent is extended or adjusted under 35 U.S.C. 154(b) by 387 days.

(21) Appl. No.: 15/201,157

(22) Filed: Jul. 1, 2016

(65) Prior Publication Data
US 2017/0250861 A1   Aug. 31, 2017

Related U.S. Application Data

(60) Provisional application No. 62/301,161, filed on Feb. 29, 2016, provisional application No. 62/301,173, filed on Feb. 29, 2016.

(51) Int. Cl.
| | |
|---|---|
| *H04L 12/24* | (2006.01) |
| *H04L 29/06* | (2006.01) |
| *H04B 7/155* | (2006.01) |
| *H04L 29/08* | (2006.01) |
| *H04L 12/26* | (2006.01) |

(52) U.S. Cl.
CPC ..... *H04L 41/0803* (2013.01); *H04B 7/15507* (2013.01); *H04L 43/087* (2013.01); *H04L 65/60* (2013.01); *H04L 65/605* (2013.01); *H04L 65/80* (2013.01); *H04L 67/1004* (2013.01); *H04L 67/146* (2013.01); *H04L 67/28* (2013.01); *H04L 67/42* (2013.01); *H04L 63/0428* (2013.01); *H04L 63/168* (2013.01)

(58) Field of Classification Search
CPC ... H04L 41/0803; H04L 43/087; H04L 67/42; H04L 67/28; H04L 65/60; H04L 67/1004; H04B 7/15507
USPC ........................................................ 709/222
See application file for complete search history.

(56) References Cited

U.S. PATENT DOCUMENTS

| | | | | |
|---|---|---|---|---|
| 5,978,673 | A * | 11/1999 | Alperovich | H04M 3/54 455/417 |
| 6,513,061 | B1 * | 1/2003 | Ebata | H04L 29/06 709/201 |
| 7,924,796 | B2 * | 4/2011 | Vu Duong | H04L 45/26 370/338 |

(Continued)

*Primary Examiner* — David P Zarka

(57) ABSTRACT

Techniques to provide relay server configuration for geographically disparate client devices are described. In one embodiment, an apparatus may comprise a client front-end component operative to receive a relay system request at a relay initiation server, the relay system request for a first client device and a second client device; and transmit a relay system address list in response to the relay system request; and a relay system selection component operative to determine a first service area for the first client device; determine a second service area for the second client device; and retrieve the relay system address list based on the first service area and the second service area, the relay system address list comprising a plurality of selected relay system network addresses for a plurality of selected relay systems of a plurality of relay systems. Other embodiments are described and claimed.

13 Claims, 11 Drawing Sheets

(56) References Cited

U.S. PATENT DOCUMENTS

| | | | | |
|---|---|---|---|---|
| 8,040,808 B1* | 10/2011 | Kasturi | H04L 45/00 | 370/238 |
| 8,509,060 B1* | 8/2013 | Dong | H04L 45/02 | 370/221 |
| 8,774,232 B2* | 7/2014 | Smith | H04J 3/0682 | 370/519 |
| 9,226,190 B2* | 12/2015 | Wen | H04W 40/12 | |
| 9,444,721 B2* | 9/2016 | Zhang | H04W 40/246 | |
| 9,986,049 B2* | 5/2018 | Zhao | H04L 67/18 | |
| 10,129,412 B1* | 11/2018 | Singh | B32B 27/22 | |
| 2002/0163884 A1* | 11/2002 | Peles | H04L 45/00 | 370/229 |
| 2010/0049869 A1* | 2/2010 | Jayaram | H04L 45/02 | 709/242 |
| 2011/0058554 A1* | 3/2011 | Jain | H04L 45/00 | 370/392 |
| 2011/0096721 A1* | 4/2011 | Kamalaraj | H04W 60/00 | 370/328 |
| 2014/0114473 A1* | 4/2014 | McNinch | G07F 11/002 | 700/241 |
| 2014/0126462 A1* | 5/2014 | Vardhan | H04B 7/15507 | 370/315 |
| 2014/0341105 A1* | 11/2014 | Vardhan | H04W 24/02 | 370/315 |
| 2015/0244761 A1* | 8/2015 | Tsyganok | G06F 11/08 | 709/219 |
| 2015/0326276 A1* | 11/2015 | Willig | H04Q 9/00 | 375/134 |
| 2016/0021149 A1* | 1/2016 | Maistri | H04L 65/403 | 348/14.08 |
| 2016/0057733 A1* | 2/2016 | Grandillo | H04H 20/423 | 370/252 |
| 2016/0254996 A1* | 9/2016 | Zhao | H04L 67/18 | 370/241 |
| 2017/0093686 A1* | 3/2017 | Uttaro | H04L 45/64 | |
| 2017/0117954 A1* | 4/2017 | Keremedjiev | H04W 64/003 | |
| 2017/0134231 A1* | 5/2017 | Smith | H04L 45/122 | |

* cited by examiner

600

Receive a relay system request at a relay initiation server for a relay service, the relay system request for a first client device and a second client device, the relay service comprising a plurality of relay systems.
*602*

Determine a first service area for the first client device.
*604*

Determine a second service area for the second client device.
*606*

Retrieve a relay system address list based on the first service area and the second service area, the relay system address list comprising a plurality of selected relay system network addresses for a plurality of selected relay systems of the plurality of relay systems.
*608*

Transmit the relay system address list in response to the relay system request.
*610*

*FIG. 6*

TECHNIQUES TO PROVIDE RELAY SERVER CONFIGURATION FOR GEOGRAPHICALLY DISPARATE CLIENT DEVICES

RELATED APPLICATIONS

This application claims the benefit of priority under 35 U.S.C. § 119(e) to U.S. Provisional Patent Application No. 62/301,161, titled "Techniques to Provide Relay Server Configuration for Geographically Disparate Client Devices," filed on Feb. 29, 2016, which is hereby incorporated by reference in its entirety.

This application claims the benefit of priority under 35 U.S.C. § 119(e) to U.S. Provisional Patent Application No. 62/301,173, titled "Techniques to Perform the Dynamic Configuration of Load-Balanced Relay Operations," filed on Feb. 29, 2016, which is hereby incorporated by reference in its entirety.

BACKGROUND

Users of mobile devices, such as smartphones, may use their mobile devices to execute applications. These applications may perform communications and network tasks on behalf of their user. An application may comprise a communications application for communication between users. This communication may include the transmission of streaming content, including streaming audio content such as a voice-over-Internet-Protocol (VoIP) communication exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to provide relay server configuration for geographically disparate client devices. Some embodiments are particularly directed to techniques to provide relay server configuration for geographically disparate client devices using pre-computation of average combined latency for all pairs of geographic service areas. In one embodiment, for example, an apparatus may comprise a client front-end component operative to receive a relay system request at a relay initiation server for a relay service, the relay system request for a first client device and a second client device, the relay service comprising a plurality of relay systems; and transmit a relay system address list in response to the relay system request; and a relay system selection component operative to determine a first service area for the first client device; determine a second service area for the second client device; and retrieve the relay system address list based on the first service area and the second service area, the relay system address list comprising a plurality of selected relay system network addresses for a plurality of selected relay systems of the plurality of relay systems. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
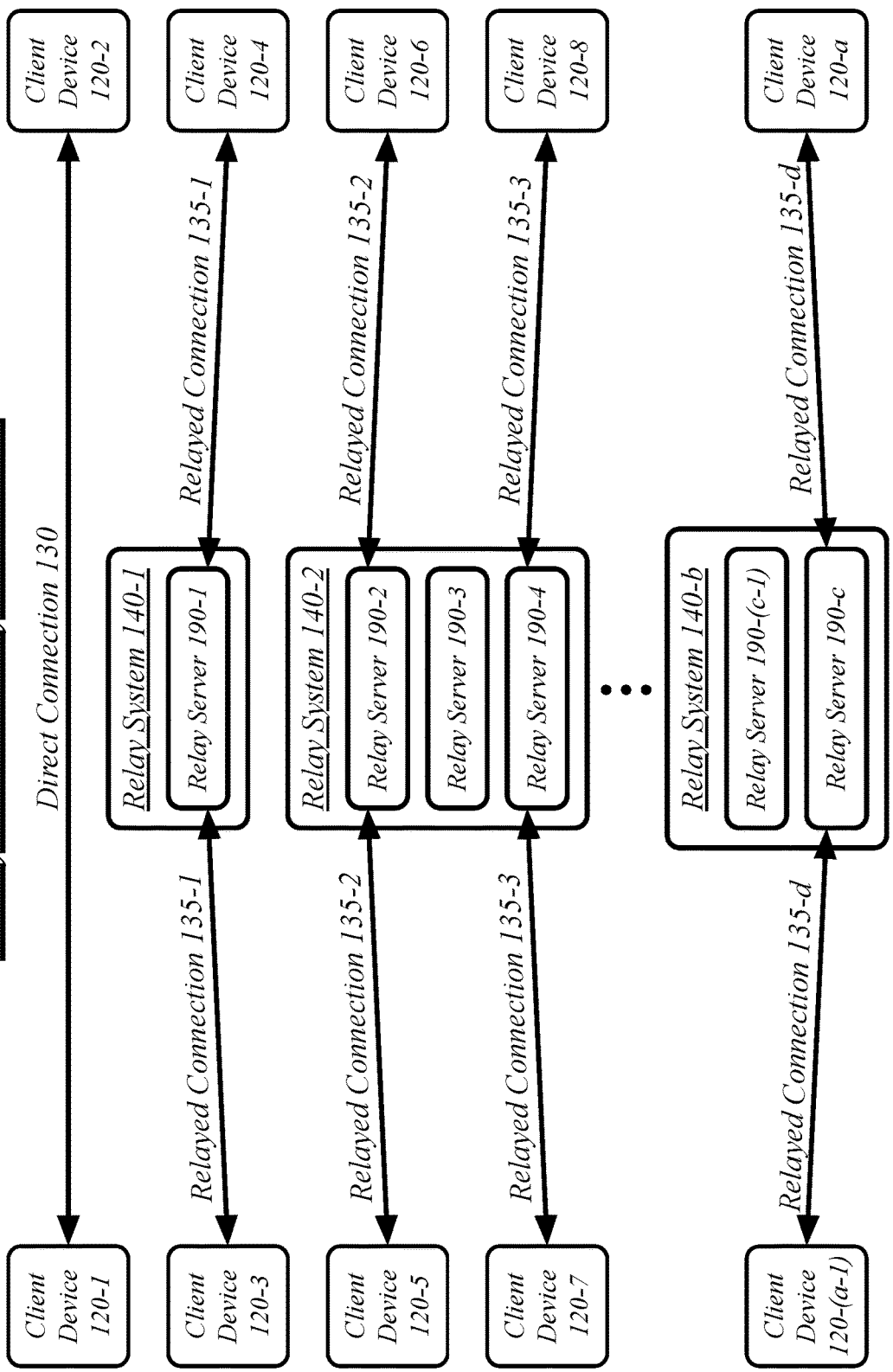
FIG. 1 illustrates an embodiment of a relay system.

Client devices may connect to a communications service remotely using a network such as the Internet. Particularly where a service offers access to clients across a wide geographic region, the service may use two or more regional systems placed in distinct geographic locations with corresponding distinct network performance (e.g., latency, bandwidth) to users with their own distinct geographic locations and network access. The user of a client device may be served by being directed to the regional system which will offer them the best performance or being offered multiple options comprising a subset of the available regional systems for them to test on-demand and select between.

Where the relevant performance of the communications service to a client device is the individual round-trip time (RTT) performance between the client device and the service, the preferred regional system may be the system whose performance for this individual client device is the best according to one or more metrics. However, some network services may involve communication in which a central server acts as an intermediary between two or more client devices: voice-over-internet-protocol (VoIP), online gaming, or other multiparty communication. For these services, the relevant performance may relate to the network performance from one client device to another, or from one client device to all other client devices. Where latency is the key measure, the relevant measure may be the cumulative latency for each client device to the server device, with the goal of the system being to minimize this cumulative latency. Where bandwidth is the key measure, the relevant measure may be the minimum bandwidth for each client device to and/or from the server device. It will be appreciated that other measures may be used. As a result, the embodiments can improve the performance of a communications service for its users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a relay service system 100. In one embodiment, the relay service system 100 may comprise a computer-implemented system having software applications comprising one or more components. Although the relay service system 100 shown in FIG. 1 has a limited number of elements in a certain topology, it may be appreciated that the relay service system 100 may include more or less elements in alternate topologies as desired for a given implementation.

A communications system may be generally arranged to enable communication. For instance, a communication systems may receive, store, and deliver messages. A communications system may act as any sort of communications intermediary, such as for messaging, VoIP, online gaming, or other intermediated online interaction between multiple client devices. A communications system may store messages while communications applications, such as may execute on client devices 120 are offline and deliver the messages once the communications applications are available. A communications system may empower the engagement and performance of other communication tasks, such as audio and/or video calls.

A plurality of client devices 120 may operate as part of the relay service system 100, transmitting messages and otherwise communicating between each other as part of a communications system. The client devices 120 may execute communications applications for the communications system, wherein each of the client devices 120 and their respective communications applications are associated with a particular user of the communications system. In some embodiments, the client devices 120 may be cellular devices such as smartphones and may be identified to the communications system based on a phone number associated with each of the client devices 120. In some embodiments, the client devices 120 may be identified to the communications system based on a user account registered with the communications system—and potentially a social networking system that comprises or is associated with the communications system—and logged into from the communications application executing on the client devices 120. In general, each communications application may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a communications system using web browser accessing a web server, for instance.

Streaming network connections within the communications system may be performed directly or via relay systems 140. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay system provided as part of the communications system, the relay system then forwarding the network packets to the destination client device. Relay systems 140 may be used, for instance, to bridge NAT devices that are not configured to sufficiently expose a destination client device for the performance of a direct connection. In some embodiments, a relay system may comprise a single relay server, with the relay server and the relay system being equivalent. In other embodiments, a relay system may comprise a plurality of relay servers, with the relaying tasks of the relay system distributed among the relay servers, such as where a given client device or set of client devices interoperating with each other are assigned a particular relay server of a plurality of relay servers 190.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Relay service system 100 may include an authorization server (or other suitable component(s)) that allows users to opt in to or opt out of having their actions logged by relay service system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of relay service system 100 and other elements of a messaging system through blocking, data hashing, anonymization, or other suitable techniques as appropriate. For instance, a user may be empowered to configure privacy settings determining whether network performance information is logged by the relay service system 100 and analyzed. In some embodiments, a user may be presented with information regarding may be collected and how that information may be used, such as informing the user that collected information may be anonymized prior to analysis.

Figure 2:
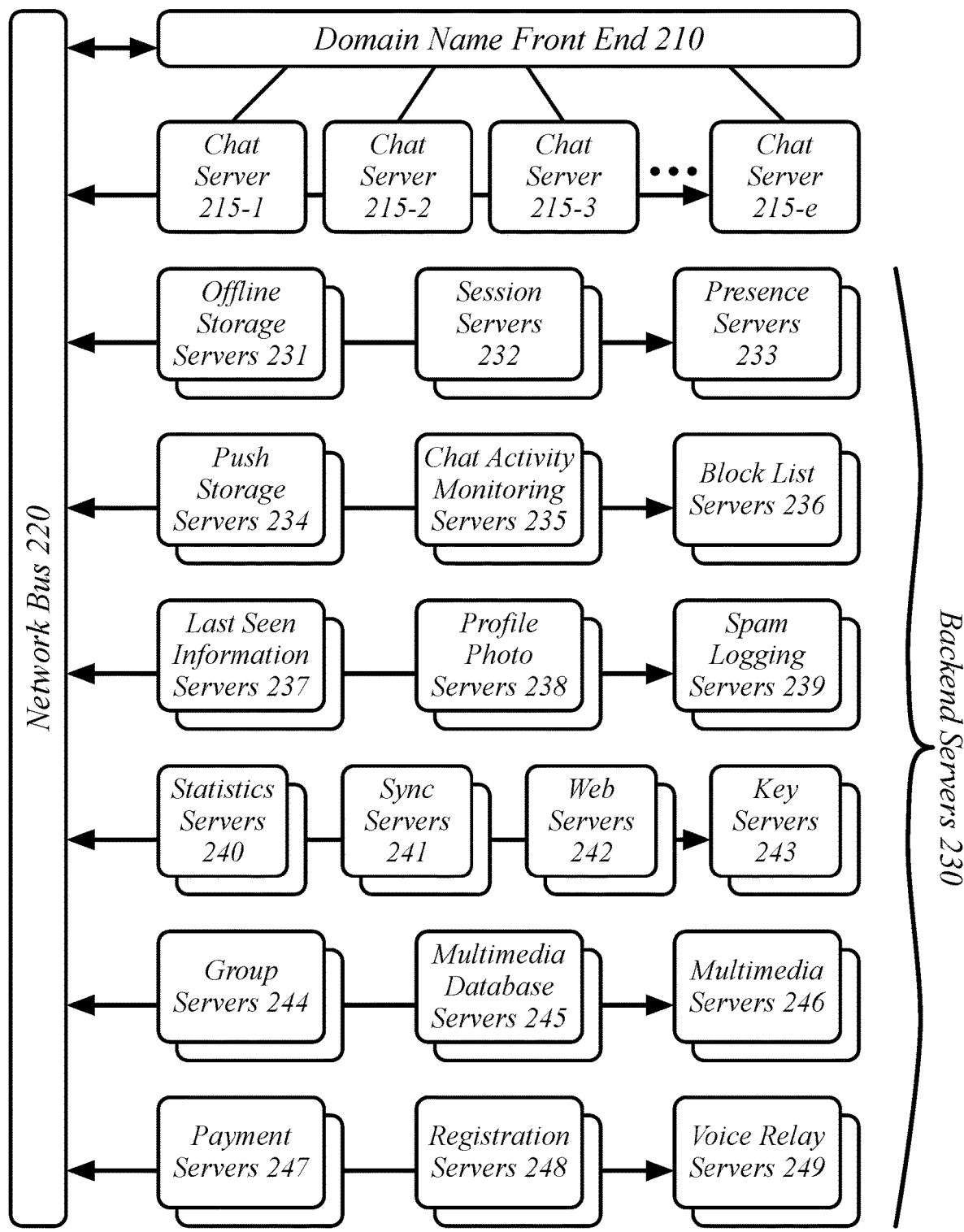
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the relay service system 100 with the operations of the relay service system 100 comprising a portion of the overall operations of the messaging system 200. The illustrated embodiment of the messaging system 200 may particularly correspond to a portion of the communications system described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing. Where a user engages in a VoIP interaction, a chat server may act as a relay initiation system to authorize access to the voice relay servers 249 and to provide information to the client devices for the selection of a particular relay system within the plurality of voice relay servers 249.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls. The one or more voice relay servers 249 may comprise a plurality of relay systems, such as may be geographically distributed into different geographic service areas.

Figure 3:
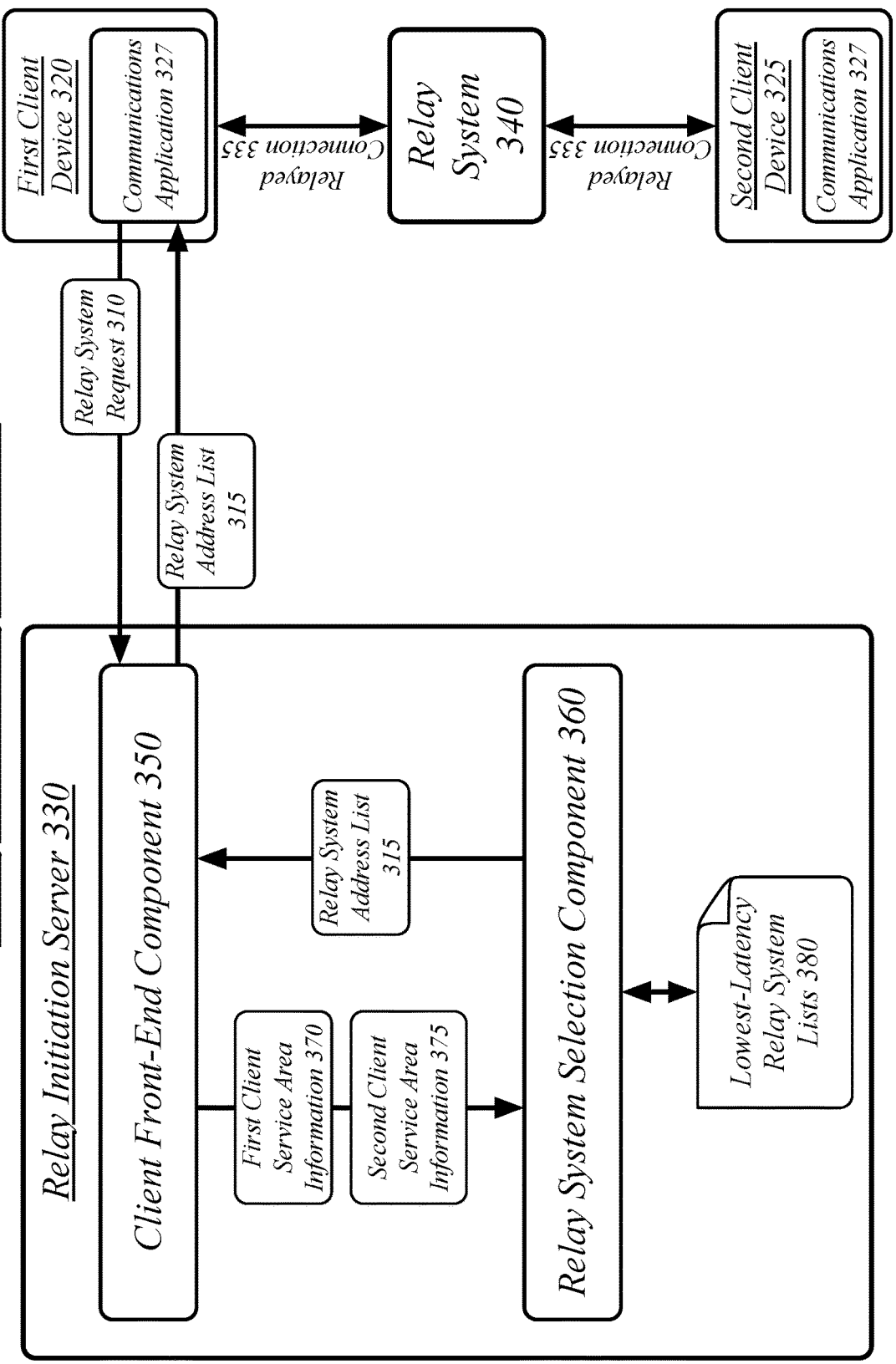
FIG. 3 illustrates an embodiment of the relay system processing a two-party relay system request.

FIG. 3 illustrates an embodiment of the relay service system 100 processing a two-party relay system request 310.

A relay service system 100 may include a relay initiation server 330 generally arranged to empower a client device to engage in relay activity using the relay service system 100. A relay initiation server 330 may also serve additional functions in a relay service system 100. For instance, where the relay service system 100 is a component of a messaging system 200, the relay initiation server 330 may correspond to a chat server, wherein each of the plurality of chat servers 215 is operative to initiate a process for client devices in engaging in relay services, such as a VoIP call.

The relay initiation server 330 may comprise a client front-end component 350. The client front-end component 350 may be generally arranged to exchange information with client devices to empower the client devices to engage in relay activity using the relay service system 100. The client front-end component 350 may receive a relay system request 310, the relay system request 310 for a first client device 320 and a second client device 325. The relay system request 310 may be a request for relay service by a relay system. The relay service may comprise a plurality of relay systems 140 operative to provide relay service, with the client device requesting addressing information for one or more relay systems to select from for relay service. The client front-end component 350 may transmit a relay system address list 315 in response to the relay system request. The relay system address list 315 may comprise a plurality of network addresses, wherein each of the plurality of network addresses corresponds to a relay system of a set of selected relay systems.

In some embodiments, the relay system request 310 may be received only from an initiation first client device 320 of the pair of client devices 320, 325. In other embodiments, a relay system request may be received from each of the of the client devices 320, 325, such as where the pair of client devices 320, 325 is using the relay initiation server 330 for chat relay services and jointly communicate that they'd like to engage in a VoIP call. In some embodiments, the client front-end component 350 may provide the relay system address list 315 to a first client device 320 with the first client device 320 providing the relay system address list 315 to the second client device 325. In other embodiments, the client front-end component 350 may provide the relay system address list 315 directly to both the first client device 320 and the second client device 325.

Where the relay system request 310 is received only from the first client device 320, the relay system request 310 may comprise a second client network address for the second client device 325, wherein this second client network address is used to determine the service area for the second client device 325. Alternatively, a first relay system request 310 may be received from the first client device 310 via a first network communication from the first client network address and a second relay system request may be received from the second client device 325 via a second network communication from a second client network address. The client front-end component 350 may therefore determine the first client network address based on the first network communication being received from the first client network address and determine the second client network address based on the second network communication being received from the second client network address.

The relay initiation server 330 may comprise a relay system selection component 360. The relay system selection component 360 may be generally arranged to retrieve a relay system address list 315 appropriate to the pair of client devices 320, 325 requesting relay system service. The relay system selection component 360 may be operative to determine a first service area for the first client device 320, determine a second service area for the second client device 325, and retrieve a relay system address list 315 based on the first service area and the second service area. A relay system address list 315 may comprise a plurality of selected relay system network addresses for a plurality of selected relay systems of the plurality of relay systems 140. The selected relay systems may be a set of relay systems selected based on a prediction of low-latency relay for the client devices 320, 325 based on the service areas for the client devices 320, 325.

A service area may correspond to a geographical region. However, as service areas may be defined at least in part based on network access, service areas may overlap, such as where network access for two different services, with different network performance characteristics, are primarily associated with distinct geographic areas but include a shared geographic area to which they both provide service. For example, some customers in Northern California may receive network access that groups them with customers in Southern California while other customers in Northern California receive network access that groups them with customers in the Pacific Northwest (e.g., Oregon and Washington state). Services areas may be manually predefined and may be selected as being regions sufficiently large that the service area for a customer can be reliably determined while sufficiently small that the service area for a customer is a useful predictor of their network performance to various relay systems. In general, a relay service may divide a total supported service area into a plurality of service areas, which plurality of services areas includes the first service area and the second service area.

The relay system selection component 360 may receive client service area information 370, 375 for the client devices 320, 325. First client service area information 370 may comprise information relevant to the determination of a service area for the first client device 320. Second client service area information 375 may comprise information relevant to the determination of a service area for the second client device 325. Client service area information 370, 375 may include a network address for a client device 320, 325, header information indicating a network service provider for the client device 320, 325, direct location information (e.g., global positioning system (GPS) information or location information inferred from wireless networks perceptible to a client device 320, 325), or any other information relating a service area of a client device.

For instance, the first client device 320 may be associated with a first client network address and the second client device 325 may be associated with a second client network address. The relay system selection component 360 may therefore determine the first service area for the first client device based on the first client network address and determine the second service area for the second client device based on the second client network address. For instance, the relay system selection component 360 may have a subnet-to-service-area map to which it compare network addresses to determine service areas. The service area pair may then be compared to a lowest-latency relay system list 380 to determine the relay system address list 315. A lowest-latency relay system list 380 may comprise a table containing a plurality of lowest-latency relay system entries, in which each of the lowest-latency relay system entries is associated with a particular pair of service areas, such as may be indexed according to predefined identifiers for each supported service area. Each lowest-latency relay system entry may comprise a list of relay systems, with associated network addresses, determined as providing the lowest combined latency for the associated pair of service areas.

Upon receive the relay system address list 315 the first client device 320 and second client device 325 may test the network performance, particularly the latency, they each experience with each relay system on the relay system address list 315. The client devices 320, 325 may exchange the experienced network performance and select a relay system 340 with the best network performance, such as the lowest latency. It will be appreciated that for applications with significant bandwidth requirements, such as video chat, bandwidth testing may also be performed and that a combined measure of latency (for responsive communication) and bandwidth (for high-quality communication) may be used. The client devices 320, 325 may engage in a relayed connection 335 via the relay system 340. As such, by providing the relay system address list 315 may configure the client devices 320, 325 as to the network configuration for the relay of network transmissions.

In some cases a relay system may be temporarily taken offline. A relay system selection component 360 may receive a relay system outage notification for an out-of-service relay system, the out-of-service relay system associated with an out-of-service relay system network address and exclude the out-of-service relay system network address from the relay system address list 315 prior to transmission in response to the relay system request 310. In some cases, the relay system outage notification may be received in response to the out-of-service relay system being detected as being out-of-service. In other cases, the relay system outage notification may be received in response to the out-of-service relay system being scheduled to be taken out-of-service, such as for the performance of software and/or hardware updates.

Figure 4:
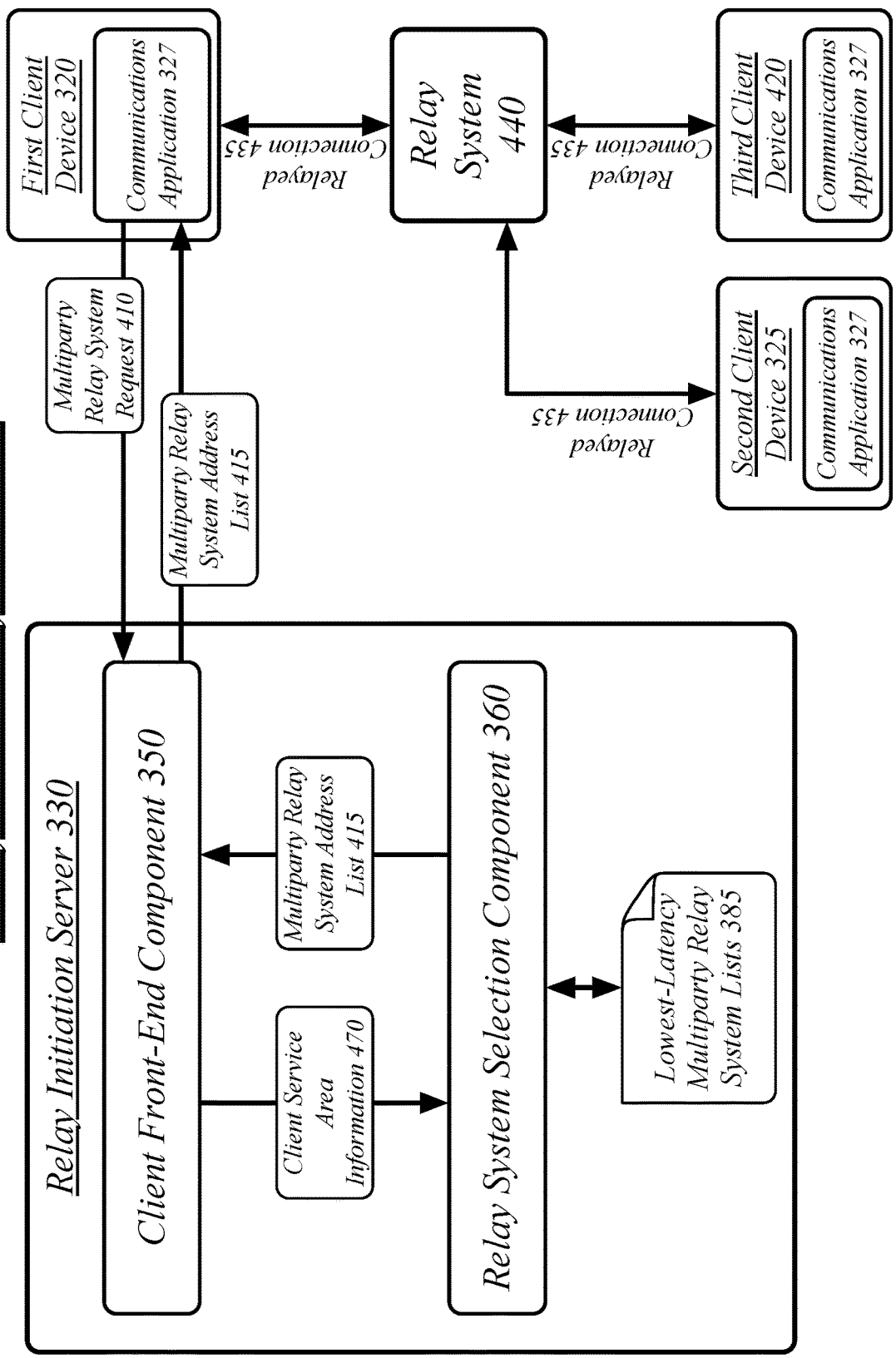
FIG. 4 illustrates an embodiment of the relay system processing a multiparty relay system request.

FIG. 4 illustrates an embodiment of the relay service system 100 processing a multiparty relay system request 410. In general, the relay service system 100 may process multiparty relay system requests using the same techniques as for other relay system requests with some additional techniques to accommodate the particular circumstances of relay system requests for more than two client devices.

A multiparty relay system request 410 may comprise a relay system request for three or more client devices. For instance, three client devices 320, 325, 420 may engage in a multiparty relay system request 410, such as may be initiated even individually be a first client device 320 or by each of the client devices 320, 325, 420 requesting relay service.

The client front-end component 350 may receive a multiparty relay system request 410, the multiparty relay system request 410 associated with three or more client devices. The client front-end component 350 may transmit a multiparty relay system address list in response to the multiparty relay system request 410 based on a plurality of lowest-latency multiparty relay system lists 385. The lowest-latency multiparty relay system lists 385 may comprise pre-calculated lists of the predicted lowest-latency relay systems for various sets of service areas.

The relay system election component 360 may receive client service area information 470 from the client front-end component 350. In general the client service area information 470 may correspond to the client service area information 370, 375 described with reference to FIG. 3. The client service area information 470 may comprise the network address of the client devices associated with the multiparty relay system request 410, with the subnets of the network addresses being used to look up the service areas, with the service areas then being used to retrieve the multiparty relay system address list 415 for the set of service areas determined based on the client service area information 470.

Upon receive the multiparty relay system address list 415 the client devices may test the network performance, particularly the latency, that they experience with each relay system on the multiparty relay system address list 415. The client devices may exchange the experienced network performance and select a relay system 440 with the best network performance, such as the lowest latency. It will be appreciated that for applications with significant bandwidth requirements, such as video chat, bandwidth testing may also be performed and that a combined measure of latency (for responsive communication) and bandwidth (for high-quality communication) may be used. The client devices may engage in a relayed connection 435 via the relay system 440.

Figure 5:
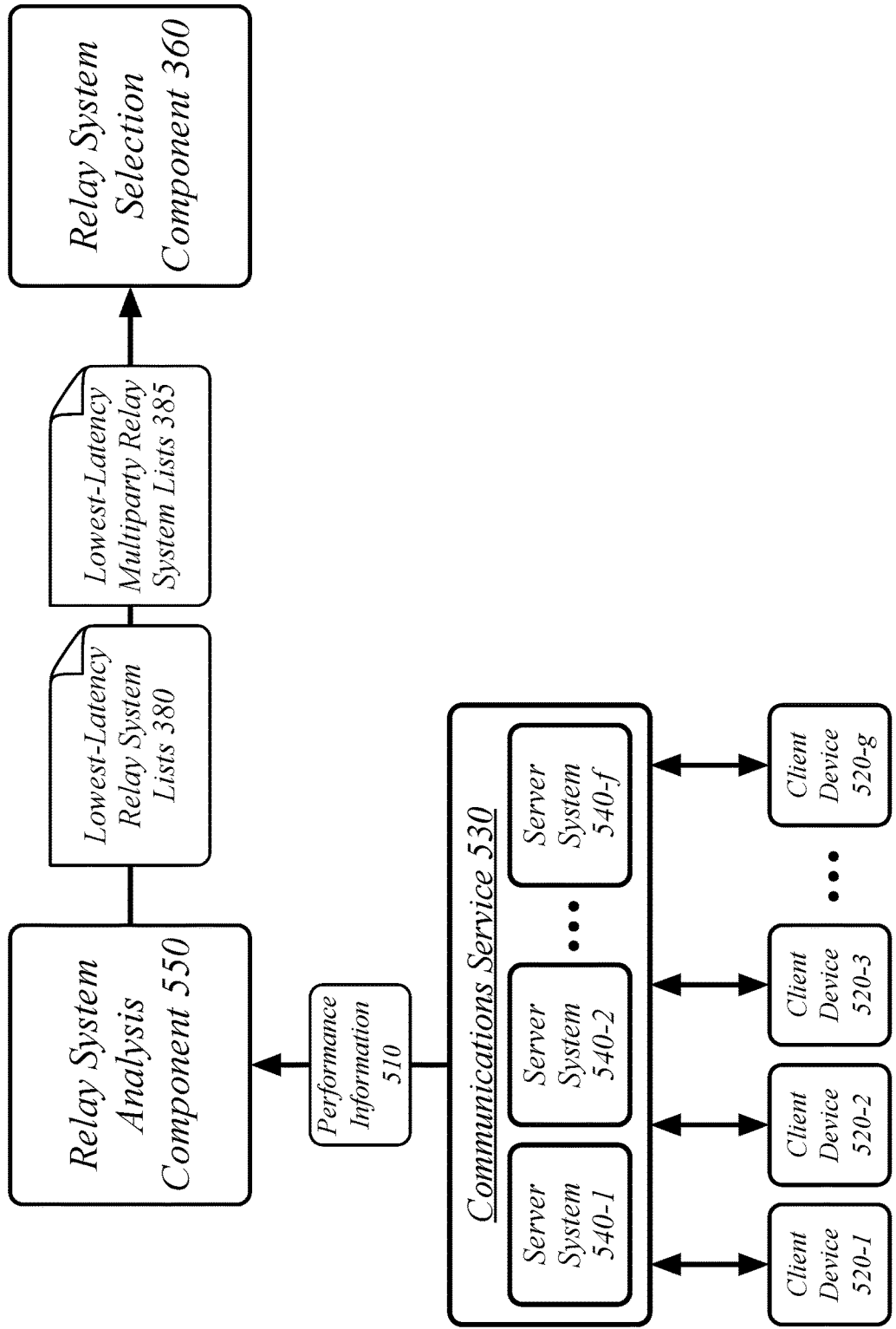
FIG. 5 illustrates an embodiment of the relay system generating relay system lists.

FIG. 5 illustrates an embodiment of the relay service system 100 generating relay system lists 380, 385.

A relay system list 380, 385 may generally correspond to a pre-calculated table of high-performance (e.g., low latency) relay systems for sets (i.e., two or more) of client devices based on the service areas of the client devices. The service areas of the client devices may be different from each other or, in some cases, the same service area. The service areas used to index the table of relay systems may be the same or different as geographic regions used for the provisioning of geographically-distributed relay systems.

A relay service providing the relay service system 100 may divide a total supported service area into a plurality of service areas including the first service area of the first client device 320 and the second service area of the second client device 325. The total supported service area comprises the entire geographic region serviced by the relay service system 100. The division of the total supported service area in the plurality of service areas may be performed based on the ability of the relay service system 100 to divine service areas based on service area information, such as through matching subnet addresses to geographic areas. In some cases, at least a portion of the service areas may comprise nations. In some cases, multiple nations may be joined together into a single service area. In some cases, a nation may be divided into multiple service areas, particularly for larger nations like the United States, which may be divided into, for example, a western region and eastern region.

The relay service system 100 may comprise a relay system analysis component 550, the relay system analysis component 550 generally arranged to generate the relay system lists 380, 385 based on performance information 510. The performance information 510 may be based on measured client latency for a plurality of client devices 520. The relay system analysis component 550 may receive performance information 510 relevant to each of the plurality of relay systems 140 from a communications service 530. In some cases, the communications service 530 may comprise the messaging service 200. In some cases, the communications service 530 may comprise a separate communications service, such as a distinct messaging service, a social-networking service, or any other service empowered to collect real-world data regarding client device network performance.

The communications service 530 may comprise a plurality of server systems 540. The plurality of server systems may correspond to the relay systems 140. The plurality of server systems may comprise other server systems comprising part of the relay service system 100 or messaging system 200. The plurality of server systems may comprise server systems part of a distinct service, such as a distinct messaging, social-networking, or other service. The server systems 540 may interact with client devices 520 and generate performance information 510 relating to the network performance experienced in communicating between the location of the server systems 540 and the locations of the client devices 520. The client devices 520 may comprise client devices that interact with the messaging system 200 or distinct client devices 520. As the performance information 510 relates to the general network performance, and used to calculate average network performance, for users in a service area with regards to server systems in a particular location, neither the server systems 540 nor the client devices 520 must be the same server systems or client devices used for the performance of relay service. As such, the relay service system 100 may gather performance information 510 from distinct server systems and use the performance information 510 to generate its relay system lists 380, 385. This performance information 510 may particularly be useful where the server systems 540 and the relay systems 140 are co-located or nearly co-located, such as generally having similar network performance characteristics.

The performance information 510 may comprise latency information for each of the plurality of service areas. The performance information 510 may comprise or be used to generate an average latency for network devices between each particular server system of the plurality of server systems 540 and client devices 520 in various regions. The relay system analysis component 550 may determine a plurality of lowest-latency relay system lists based on the performance information 510, wherein each of the plurality of lowest-latency relay system lists corresponds to a pair of service areas of the plurality of services areas. The plurality of selected relay systems that correspond to the relay system address list 315 provided to the client devices 320, 325 may therefore comprise a lowest-latency relay system list for a service area pair comprising the first service area and the second service area.

The relay system analysis component 550 may generate an average latency for the client devices 520 in each service area to each of the server systems 540, which may be used as an estimation for the average latency that would be experienced by client devices 120 of the relay service system 100 in each service area to each of the relay systems 140. For each pair of service areas the relay system analysis component 550 may calculate the summed average latency for devices in each of the pair of service areas to each of the server systems 540. For each pair of service areas the relay system analysis component 550 may then select a predefined number of the lowest summed average latencies and select the relay systems 140 for including in the lowest-latency relay system list 380 for that pair of service areas for the associated relay system. This may be performed for each pair of service areas—including the pairs of services areas of each service area being matched with itself—to generate the lowest-latency relay system lists 380.

It may be impractical to generate lowest-latency multiparty relay system lists 385 for all possible sets of service areas that may be used by three or more client devices. As such, the lowest-latency multiparty relay system lists 385 may only be generated for a subset of the possible sets of services areas. The relay system analysis component 550 may receive a multiparty relay request popularity list, the multiparty relay request popularity list representing respective popularities of relay system requests for groups of three or more client devices as experienced by the relay service system 100. The relay system analysis component 550 may then determine a plurality of lowest-latency multiparty relay system lists 385 based on the performance information 510, wherein each of the plurality of lowest-latency multiparty relay system lists 385 corresponds to a set of service areas of the plurality of services areas. A plurality of sets of service areas may be selected for determining the plurality of lowest-latency multiparty relay system lists 385 based on the multiparty relay request popularity list. For instance, a predefined number of lowest-latency multiparty relay system lists 385 may be determined by selecting the predefined number of sets of service areas with the highest proportion of respective popularity of relay system requests as experienced by the relay service system 100. The multiparty relay request popularity list may be for a defined period, such as the most recent week, two weeks, or month, without limitation.

In some embodiments, each of the plurality of lowest-latency relay system lists 380 may be augmented with one or more backup relay systems from one or more distinct geographical regions. One or more relay systems may be defined as backup relay systems and included in the relay system lists 380, 385. In some cases, the backup relay systems may be selected as being of a different geographic region than any of those in the automatically-generated lowest-latency list. A different geographic region may specifically be selected as being on, for instance, a different continent so as to provide options to a client even where a region-wide service outage is experienced. In some embodiments, the backup relay systems may be manually selected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a relay system request at a relay initiation server for a relay service, the relay system request for a first client device and a second client device, the relay service comprising a plurality of relay systems at block 602.

The logic flow 600 may determine a first service area for the first client device at block 604.

The logic flow 600 may determine a second service area for the second client device at block 606.

The logic flow 600 may retrieve a relay system address list based on the first service area and the second service area, the relay system address list comprising a plurality of selected relay system network addresses for a plurality of selected relay systems of the plurality of relay systems at block 608.

The logic flow 600 may transmit the relay system address list in response to the relay system request at block 610.

The embodiments are not limited to this example.

Figure 7:
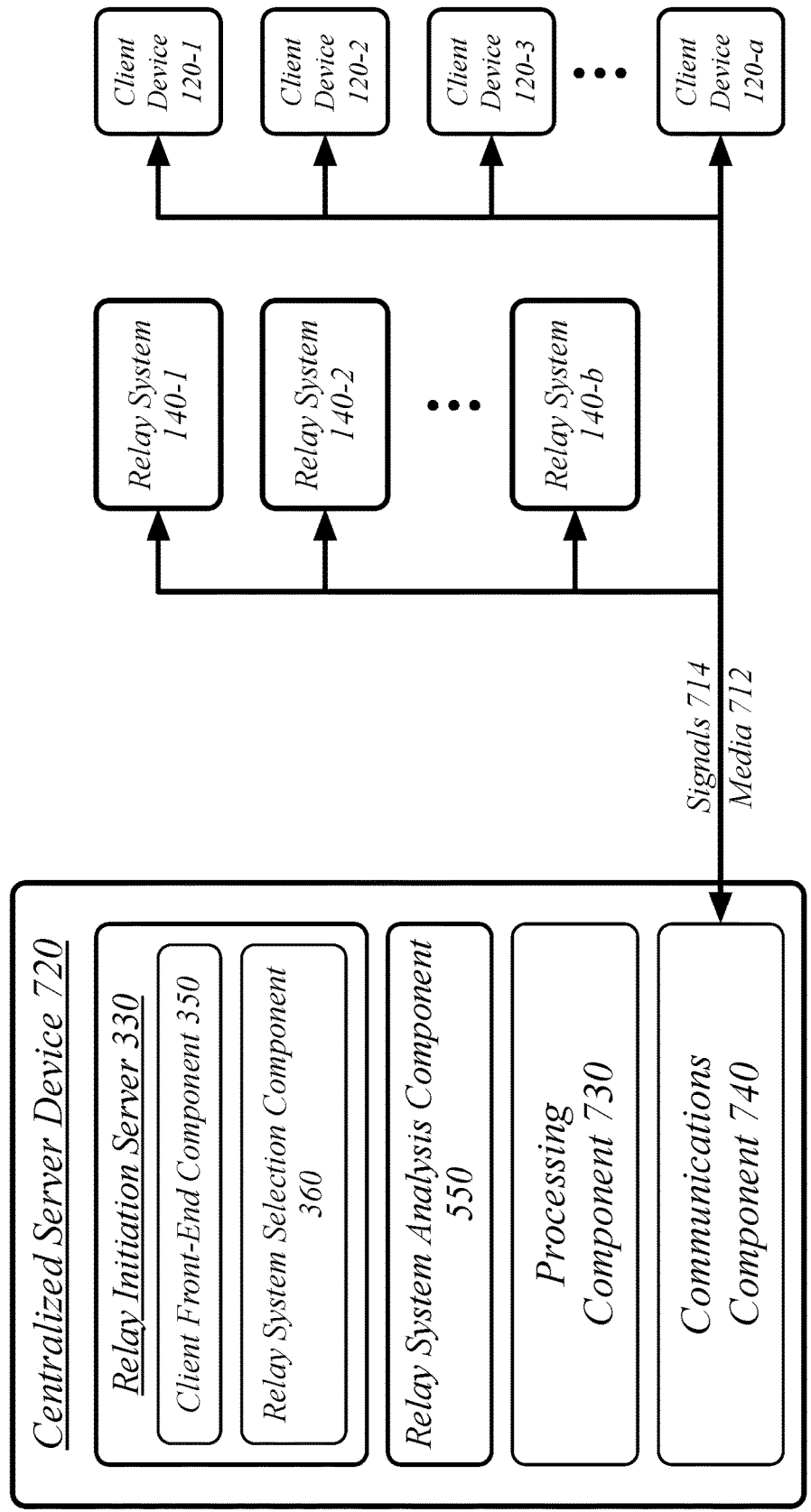
FIG. 7 illustrates an embodiment of a centralized system for the system of FIG. 1.

FIG. 7 illustrates a block diagram of a centralized system 700. The centralized system 700 may implement some or all of the structure and/or operations for the relay service system 100 in a single computing entity, such as entirely within a single centralized server device 720.

The centralized server device 720 may comprise any electronic device capable of receiving, processing, and sending information for the relay service system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the relay service system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the relay service system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation. The centralized server device 720 may execute both the relay initiation server 530 and the relay system analysis component 550. The centralized server device 720 may communicate with the relay systems 140 and the client devices 120 using the signals 714 transmitted over the media 712.

Figure 8:
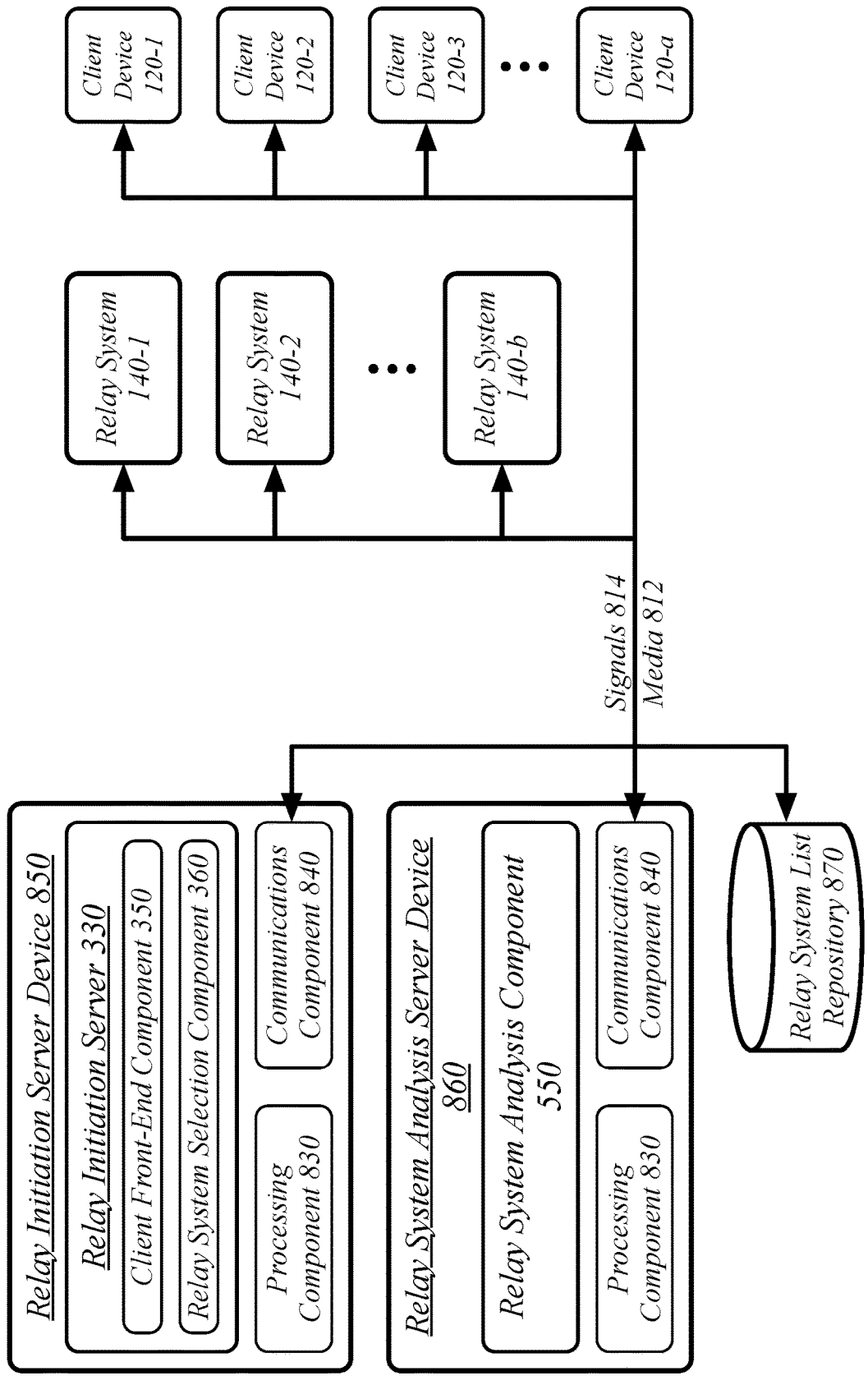
FIG. 8 illustrates an embodiment of a distributed system for the system of FIG. 1.

FIG. 8 illustrates a block diagram of a distributed system 800. The distributed system 800 may distribute portions of the structure and/or operations for the relay service system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a relay initiation server device 850 and a relay system analysis server device 860. In general, the server devices 850, 860 may be the same or similar to the centralized server device 720 as described with reference to FIG. 7. For instance, the server devices 850, 860 may each comprise a processing component 830 and a communications component 840 which are the same or similar to the processing component 730 and the communications component 740, respectively, as described with reference to FIG. 7. In another example, the server devices 850, 860 may communicate over a communications media 812 using communications signals 814 via the communications components 840.

The relay initiation server device 850 may comprise or employ one or more programs that operate to perform various methodologies in accordance with the described embodiments. In one embodiment, for example, the relay initiation server device 850 may implement the relay initiation server 330. It will be appreciated that a plurality of relay initiation server devices may be used in some embodiments.

The relay system analysis server device 860 may comprise or employ one or more programs that operate to perform various methodologies in accordance with the described embodiments. In one embodiment, for example, the relay system analysis server device 860 may implement the relay system analysis component 550. It will be appreciated that a plurality of relay system analysis server devices may be used in some embodiments.

The server devices 850, 860 may communicate with the relay systems 140 and the client devices 120 using the signals 814 transmitted over the media 812.

Figure 9:
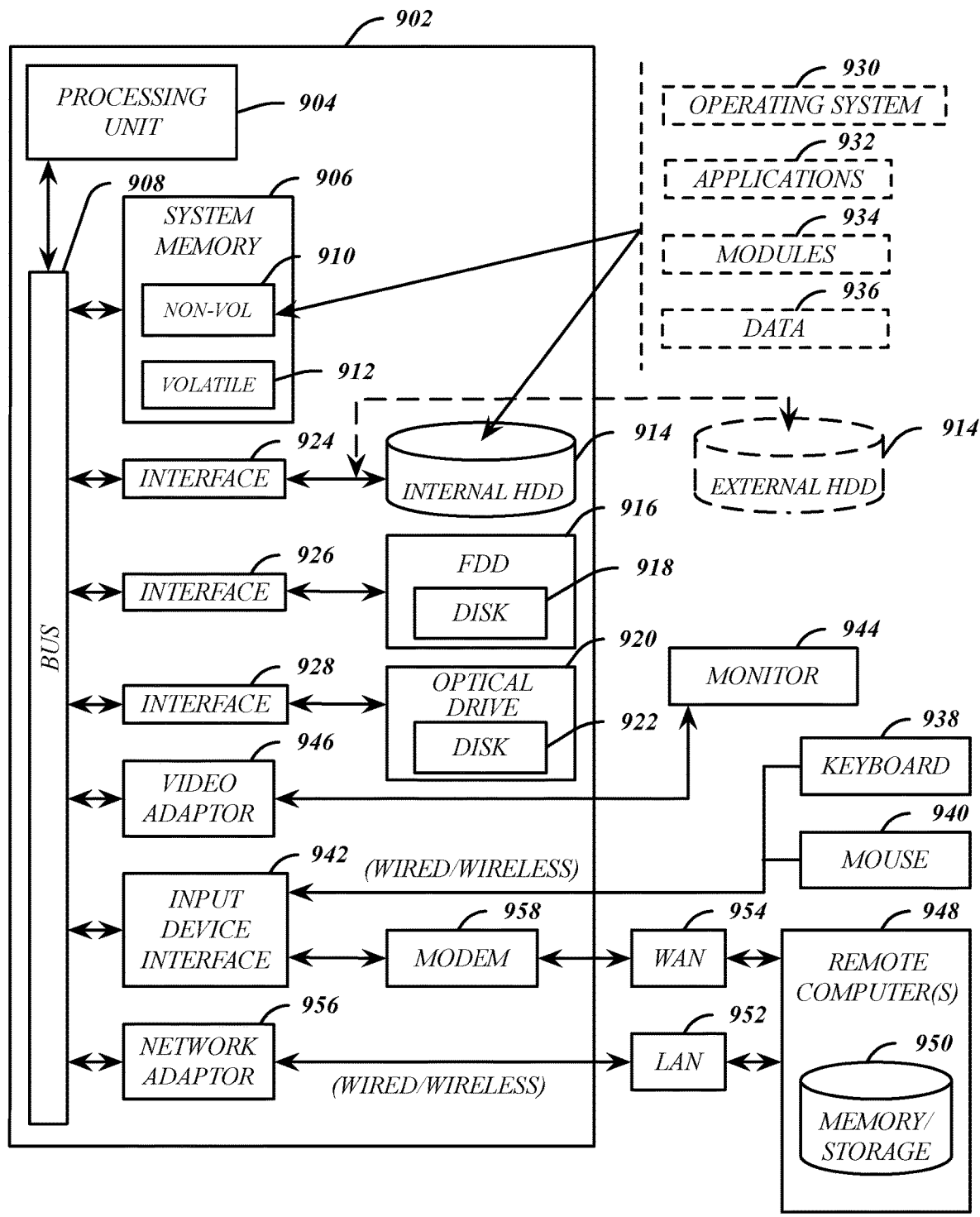
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the relay service system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
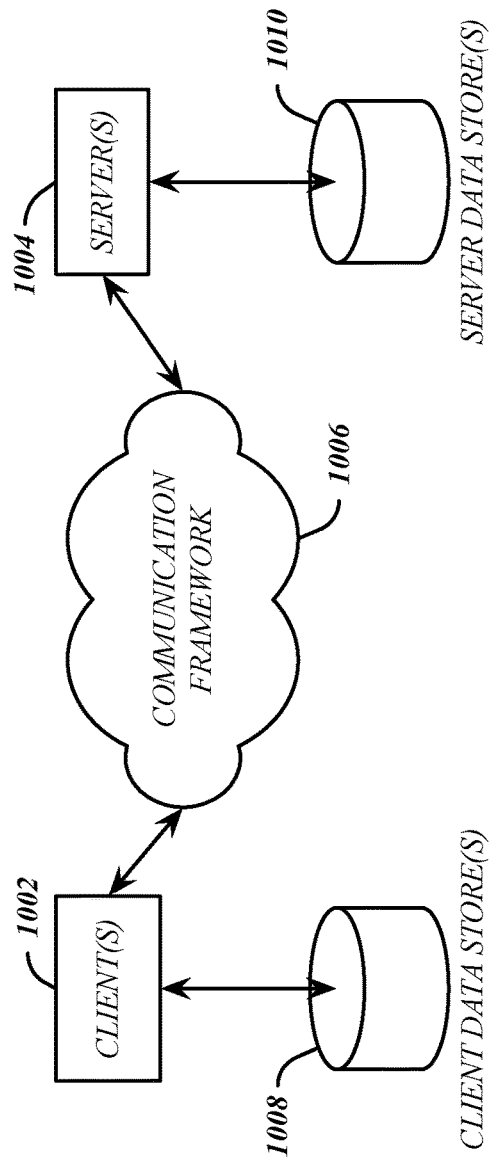
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may correspond to the client devices 120, 520. The servers 1004 may correspond to the server devices 720, 850, 860 and the servers 190, 340, 440, 540. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
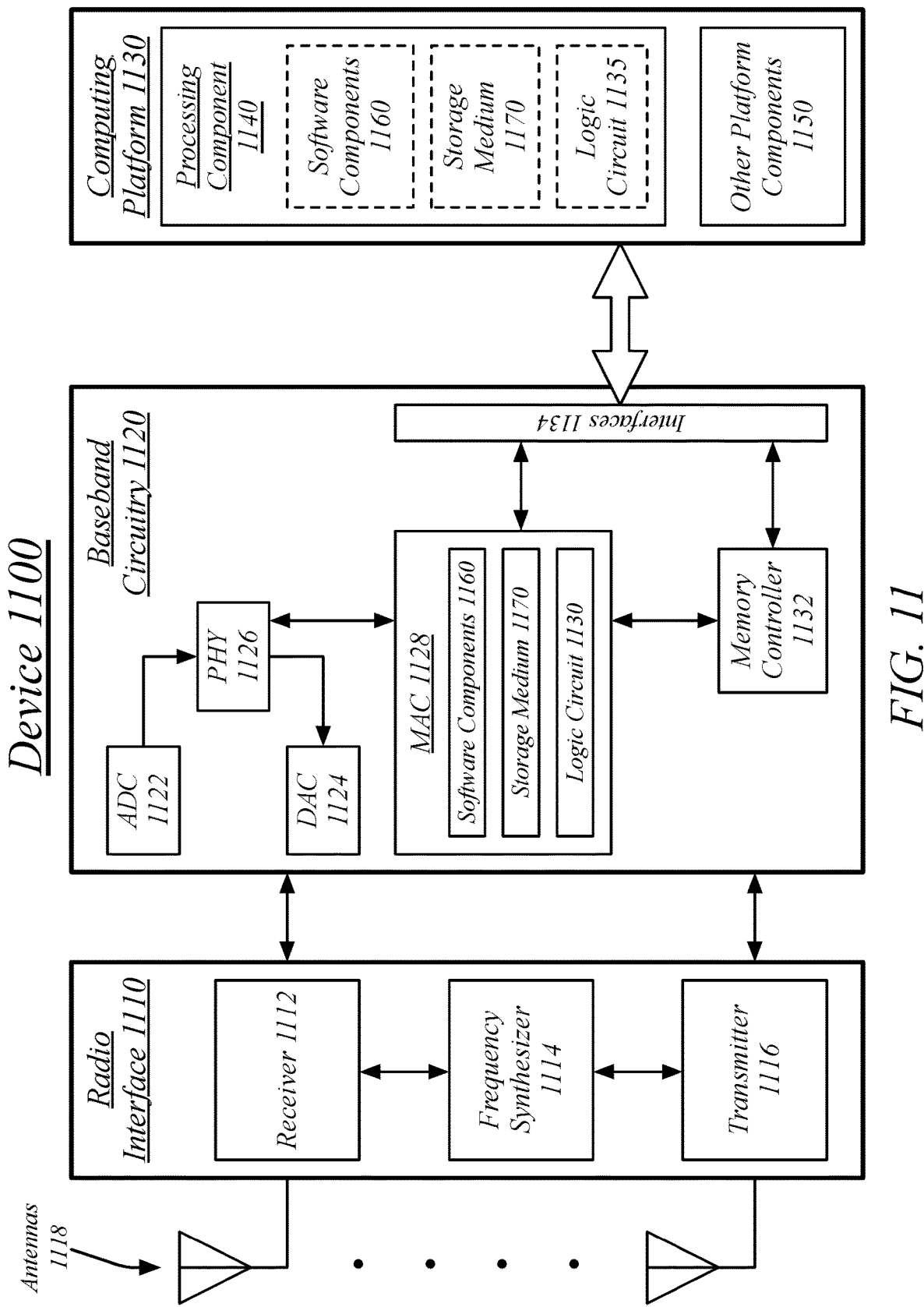
FIG. 11 illustrates an embodiment of a radio device architecture.

FIG. 11 illustrates an embodiment of a device 1100 for use in a multicarrier OFDM system, such as the relay service system 100. Device 1100 may implement, for example, software components 1160 as described with reference to relay service system 100 and/or a logic circuit 1135. The logic circuit 1135 may include physical circuits to perform operations described for the relay service system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the relay service system 100 and/or logic circuit 1135 in a single computing entity, such as entirely within a single device. Alternatively, the device 1100 may distribute portions of the structure and/or operations for the relay service system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the relay service system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a relay system request at a relay initiation server for a relay service, the relay system request for a first client device and a second client device, the relay service comprising a plurality of relay systems; determining a first service area for the first client device; determining a second service area for the second client device; retrieving a relay system address list based on the first service area and the second service area, the relay system address list comprising a plurality of selected relay system network addresses for a plurality of selected relay systems of the plurality of relay systems; and transmitting the relay system address list in response to the relay system request.

A computer-implemented method may further comprise the first client device associated with a first client network address, the second client device associated with a second client network address, comprising: determining the first service area for the first client device based on the first client network address; and determining the second service area for the second client device based on the second client network address.

A computer-implemented method may further comprise the relay system request received from the first client device, the relay system request comprising the second client network address.

A computer-implemented method may further comprise the relay system request received from the first client device via a first network communication from the first client network address, further comprising: receiving a second relay system request from the second client device via a second network communication from the second client network address; determining the first client network address based on the first network communication being received from the first client network address; and determining the second client network address based on the second network communication being received from the second client network address.

A computer-implemented method may further comprise the relay service dividing a total supported service area into a plurality of service areas including the first service area and the second service area, further comprising: receiving performance information relevant to each of the plurality of relay systems, the performance information comprising latency information for each of the plurality of service areas; and determining a plurality of lowest-latency relay system lists based on the performance information, wherein each of the plurality of lowest-latency relay system lists corresponds to a pair of service areas of the plurality of services areas, wherein the plurality of selected relay systems corresponding to the relay system address list comprises a lowest-latency relay system list for a service area pair comprising the first service area and the second service area.

A computer-implemented method may further comprise augmenting each of the plurality of lowest-latency relay system lists with one or more backup relay systems from one or more distinct geographical regions.

A computer-implemented method may further comprise the performance information based on measure client latency for a plurality of client devices.

A computer-implemented method may further comprise receiving a relay system outage notification for an out-of-service relay system, the out-of-service relay system associated with an out-of-service relay system network address; and excluding the out-of-service relay system network address from the relay system address list prior to transmission in response to the relay system request.

A computer-implemented method may further comprise wherein the relay system outage notification is received in response to the out-of-service relay system being detected as being out-of-service.

A computer-implemented method may further comprise wherein the relay system outage notification is received in response to the out-of-service relay system being scheduled to be taken out-of-service.

A computer-implemented method may further comprise the relay service dividing a total supported service area into a plurality of service areas, further comprising: receiving performance information for each of the plurality of relay systems, the performance information comprising latency information for each of the plurality of service areas; receiving a multiparty relay request popularity list, the multiparty relay request popularity list representing respective popularities of relay system requests for groups of three or more client devices; and determining a plurality of lowest-latency multiparty relay system lists based on the performance information, wherein each of the plurality of lowest-latency multiparty relay system lists corresponds to a set of service areas of the plurality of services areas, wherein a plurality of sets of service areas is selected for determining the plurality of lowest-latency multiparty relay system lists based on the multiparty relay request popularity list.

A computer-implemented method may further comprise receiving a multiparty relay system request at the relay initiation server, the multiparty relay system request associated with three or more client devices; and transmitting a multiparty relay system address list in response to the multiparty relay system request based on the determined plurality of lowest-latency multiparty relay system lists.

An apparatus may comprise a processor circuit on a device; a client front-end component operative on the processor circuit to receive a relay system request at a relay initiation server for a relay service, the relay system request for a first client device and a second client device, the relay service comprising a plurality of relay systems; and transmit a relay system address list in response to the relay system request; and a relay system selection component operative on the processor circuit to determine a first service area for the first client device; determine a second service area for the second client device; and retrieve the relay system address list based on the first service area and the second service area, the relay system address list comprising a plurality of selected relay system network addresses for a plurality of selected relay systems of the plurality of relay systems. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a relay system request at a relay initiation server from a first client device for relay service between the first client device having a first network address and a second client device having a second network address, the relay service dividing a total supported service area into a plurality of service areas;
determining a first service area corresponding to a first geographical area for the first client device and a second service area corresponding to a second geographical area for the second client device;
receiving performance information for each of the plurality of relay systems, the performance information comprising latency information for each of the plurality of service areas;
calculating a latency for each of the plurality of relay systems, the latency being a cumulative latency of communications between the first geographic area and the relay system and between the second geographic area and the relay system;
creating a relay system address list comprising network addresses for one or more of the plurality of relay systems having the lowest cumulative latencies; and
receiving a multiparty relay request popularity list, the multiparty relay request popularity list representing respective popularities of relay system requests for groups of three or more client devices; and
determining a plurality of lowest-latency multiparty relay system lists based on the performance information, wherein each of the plurality of lowest-latency multiparty relay system lists corresponds to a set of service areas of the plurality of services areas, wherein a plurality of sets of service areas is selected for determining the plurality of lowest-latency multiparty relay system lists based on the multiparty relay request popularity list;
wherein the first service area is determined based on the first network address; and
wherein the second service area is determined based on the second network address.

2. The method of claim 1, further comprising:
augmenting the relay system address list with one or more backup relay systems from one or more distinct geographical regions.

3. The method of claim 1, wherein the latency for each relay system is based on measured client latencies for a plurality of client devices.

4. The method of claim 1, comprising:
receiving a relay system outage notification for an out-of-service relay system, the out-of-service relay system associated with an out-of-service relay system network address; and
excluding the out-of-service relay system network address from the relay system address list prior to transmission in response to the relay system request.

5. The method of claim 1, comprising:
receiving a multiparty relay system request at the relay initiation server, the multiparty relay system request associated with three or more client devices; and
transmitting a multiparty relay system address list in response to the multiparty relay system request based on the determined plurality of lowest-latency multiparty relay system lists.

6. The method of claim 1 further comprising:
creating a plurality of lowest-latency relay system lists based on the performance information;
wherein each of the plurality of lowest-latency relay system lists corresponds to a pair of service areas of the plurality of services areas; and
wherein the plurality of selected relay systems corresponding to the relay system address list comprises a lowest-latency relay system list for a service area pair comprising the first service area and the second service area.

7. At least one non-transitory computer-readable storage medium comprising instructions stored in a memory that, when executed by a processor coupled to the memory, cause a system to:
receive a relay system request at a relay initiation server from a first client device having a first network address for relay service, between the first client device and a second client device having a second network address, the relay service dividing a total supported service area into a plurality of service areas;

determine a first service area for the first client device corresponding to a first geographical area and a second service area for the second device corresponding to a second geographic area;

receive performance information for each of the plurality of relay systems, the performance information comprising latency information for each of the plurality of service areas;

calculate a latency for each of a plurality of relay systems, the latency being a cumulative latency of communications between the first geographic area and the relay system and between the second geographic area and the relay system;

create a relay system address list comprising network addresses for one or more of the plurality of relay systems having the lowest cumulative latencies;

receive a multiparty relay request popularity list, the multiparty relay request popularity list representing respective popularities of relay system requests for groups of three or more client devices; and determine a plurality of lowest-latency multiparty relay system lists based on the performance information, wherein each of the plurality of lowest-latency multiparty relay system lists corresponds to a set of service areas of the plurality of services areas, wherein a plurality of sets of service areas is selected for determining the plurality of lowest-latency multiparty relay system lists based on the multiparty relay request popularity list;

wherein the first service area is determined based on the first network address; and wherein the second service area is determined based on the second network address.

8. The non-transitory computer-readable storage medium of claim 7, comprising further instructions that, when executed, cause a system to:

augment the relay system address list with one or more backup relay systems from one or more distinct geographical regions.

9. The non-transitory computer-readable storage medium of claim 7, comprising further instructions that, when executed, cause a system to:

receive a relay system outage notification for an out-of-service relay system, the out-of-service relay system associated with an out-of-service relay system network address; and exclude the out-of-service relay system network address from the relay system address list prior to transmission in response to the relay system request.

10. The non-transitory computer-readable storage medium of claim 7, the relay service dividing a total supported service area into a plurality of service areas, comprising further instructions that, when executed, cause a system to:

receive a multiparty relay system request at the relay initiation server, the multiparty relay system request associated with three or more client devices; and transmit a multiparty relay system address list in response to the multiparty relay system request based on the determined plurality of lowest-latency multiparty relay system lists.

11. The non-transitory computer-readable storage medium of claim 7, wherein the latency for each relay system is based on measured client latencies for a plurality of client devices.

12. The non-transitory computer-readable storage medium of claim 7, comprising further instructions that, when executed, cause a system to:

receive a multiparty relay system request at the relay initiation server, the multiparty relay system request associated with three or more client devices; and transmit a multiparty relay system address list in response to the multiparty relay system request based on the determined plurality of lowest-latency multiparty relay system lists.

13. The non-transitory computer-readable storage medium of claim 7, comprising further instructions that, when executed, cause a system to:

create a plurality of lowest-latency relay system lists based on the performance information;

wherein each of the plurality of lowest-latency relay system lists corresponds to a pair of service areas of the plurality of services areas; and wherein the plurality of selected relay systems corresponding to the relay system address list comprises a lowest-latency relay system list for a service area pair comprising the first service area and the second service area.

* * * * *